(12) United States Patent
West et al.

(10) Patent No.: US 12,131,206 B1
(45) Date of Patent: Oct. 29, 2024

(54) BIDIRECTIONAL APPLICATION PROGRAMMING INTERFACE ENABLING OPERATIONAL ACTION FUNCTIONALITY IN ONE-WAY TRANSFER SYSTEMS

(71) Applicant: Microsoft Technology Licensing, LLC, Redmond, WA (US)

(72) Inventors: Jeffrey Allen West, Woodinville, WA (US); Michael E. Roberson, Vienna, VA (US); Simon Elwin Daykin, Fordingbridge (GB); Elham Rezvani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,368

(22) Filed: May 31, 2023

(51) Int. Cl.
*G06F 15/16* (2006.01)
*G06F 9/54* (2006.01)
*G06F 21/62* (2013.01)

(52) U.S. Cl.
CPC .......... *G06F 9/547* (2013.01); *G06F 21/6218* (2013.01)

(58) Field of Classification Search
CPC .............................. G06F 9/547; G06F 21/6218
USPC ........................................................ 709/203
See application file for complete search history.

(56) References Cited

U.S. PATENT DOCUMENTS

| | | | |
|---|---|---|---|
| 6,829,741 B1 | 12/2004 | Khansari | |
| 7,272,613 B2 | 9/2007 | Sim et al. | |
| 7,418,620 B1 | 8/2008 | Tormasov | |
| 8,296,844 B2 * | 10/2012 | Bogner | G06F 21/554 726/22 |
| 8,365,266 B2 * | 1/2013 | Bogner | H04L 9/32 726/8 |
| 8,416,742 B2 | 4/2013 | Park | |
| 8,468,235 B2 * | 6/2013 | Bogner | H04L 63/0263 709/224 |

(Continued)

FOREIGN PATENT DOCUMENTS

CN 110915180 B 6/2022
EP 2865156 B1 10/2017

OTHER PUBLICATIONS

Restriction Requirement mailed on Jan. 10, 2024 in U.S. Appl. No. 18/326,339, 7 pages.

(Continued)

*Primary Examiner* — Moustafa M Meky

(57) ABSTRACT

Examples of the present disclosure describe systems and methods for a bidirectional application programming interface (API) that enables operational action functionality in a one-way transfer (OWT) system. In examples, a data request is received at a first computing environment of an OWT system, where the data request is associated with a first unidirectional dataflow having a transaction identifier. A first set of policies associated with the first computing environment is applied to the data request and the data request is transferred to a second computing environment of the OWT system. The second computing environment retrieves response data for the data request, where the response data is associated with a second unidirectional dataflow having the transaction identifier. A second set of policies associated with the second computing environment is applied to the response data and the response data is transferred to the first computing environment to fulfill the data request.

20 Claims, 5 Drawing Sheets

(56) References Cited

U.S. PATENT DOCUMENTS

| | | | |
|---|---|---|---|
| 9,098,376 B2 | 8/2015 | Resch | |
| 9,367,703 B2 * | 6/2016 | Chinta | G06F 21/6218 |
| 9,444,856 B2 | 9/2016 | Phillips | |
| 9,477,677 B1 | 10/2016 | Wang | |
| 9,697,217 B1 | 7/2017 | Salyers | |
| 9,697,228 B2 | 7/2017 | Subramanian | |
| 9,706,249 B2 | 7/2017 | Hao | |
| 9,769,235 B2 | 9/2017 | Schmidt | |
| 10,110,657 B2 | 10/2018 | Mitic | |
| 10,205,761 B2 | 2/2019 | Dimattia | |
| 11,106,810 B2 * | 8/2021 | Natanzon | H04L 9/0894 |
| 11,184,399 B2 * | 11/2021 | Foley | G06F 21/62 |
| 11,397,808 B1 * | 7/2022 | Prabhu | G06F 21/566 |
| 11,818,120 B2 * | 11/2023 | Jen | H04L 9/3239 |
| 2002/0133491 A1 | 9/2002 | Sim | |
| 2006/0242153 A1 | 10/2006 | Newberry et al. | |
| 2011/0277013 A1 * | 11/2011 | Chinta | G06F 21/54 |
| | | | 726/1 |
| 2012/0017079 A1 | 1/2012 | Mraz | |
| 2013/0041872 A1 | 2/2013 | Aizman | |
| 2013/0138775 A1 | 5/2013 | Shah | |
| 2014/0281804 A1 | 9/2014 | Resch | |
| 2014/0317071 A1 | 10/2014 | Zhou et al. | |
| 2014/0337410 A1 | 11/2014 | Mraz | |
| 2015/0058925 A1 | 2/2015 | Curry | |
| 2015/0089072 A1 | 3/2015 | Phillips | |
| 2015/0264408 A1 | 9/2015 | Hao | |
| 2015/0358305 A1 * | 12/2015 | Vänskä | H04L 63/10 |
| | | | 726/6 |
| 2015/0381690 A1 | 12/2015 | Schmidt | |
| 2017/0257178 A1 | 9/2017 | Hall | |
| 2018/0330108 A1 * | 11/2018 | Gordon | G06F 21/6218 |
| 2019/0377709 A1 | 12/2019 | Kochan | |
| 2020/0228574 A1 * | 7/2020 | Summers | H04L 63/08 |
| 2022/0182734 A1 | 6/2022 | Ryder | |
| 2023/0095692 A1 | 3/2023 | Hong | |
| 2023/0334491 A1 * | 10/2023 | Leddy, III | G06Q 20/401 |

OTHER PUBLICATIONS

International Search Report and Written Opinion received for PCT Application No. PCT/US2024/026930, Jul. 26, 2024, 16 pages.
Non-Final Office Action issued in U.S. Appl. No. 18/326,339, mailed on May 31, 2024, 19 Pages.
Bradbury, Richard, "TM-MCAST0137r1A176r3 Adaptive-Media-Streaming-over-IP-Multicast Jan. 2023 (changes since r2)", Digital Video Broadcasting, No. 1, Jan. 31, 2023, 178 Pages.
International Search Report and Written Opinion received for PCT Application No. PCT/US2024/030158, Sep. 11, 2024, 13 pages.

* cited by examiner

BIDIRECTIONAL APPLICATION PROGRAMMING INTERFACE ENABLING OPERATIONAL ACTION FUNCTIONALITY IN ONE-WAY TRANSFER SYSTEMS

BACKGROUND

One-way transfer systems facilitate the unidirectional transfer of data across one or more data boundaries. Due to the unidirectional nature of the data transfers, one-way transfer systems typically provide limited operational action functionality across the data boundaries, as the sending side of a one-way transfer system typically cannot track a data request sent to or receive information from a receiving side of the one-way transfer system. As such, it can be extremely challenging to collect information relevant to the performance and maintenance of systems on the receiving side of one-way transfer systems, while ensuring the safety and integrity of the data transferred or stored by such systems.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for a bidirectional application programming interface (API) that enables operational action functionality in a one-way transfer (OWT) system. In examples, a data request from a requestor is received at a first computing environment of an OWT system, where the data request is associated with a first unidirectional dataflow having a transaction identifier. A first set of policies associated with the first computing environment is applied to the data request and the data request is transferred to a second computing environment of the OWT system as part of the first unidirectional dataflow. The second computing environment retrieves response data for the data request, where the response data is associated with a second unidirectional dataflow having the transaction identifier. A second set of policies associated with the second computing environment is applied to the response data and the response data is transferred to the first computing environment of the OWT system as part of the second unidirectional dataflow. The response data is provided to the requestor to fulfill the data request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
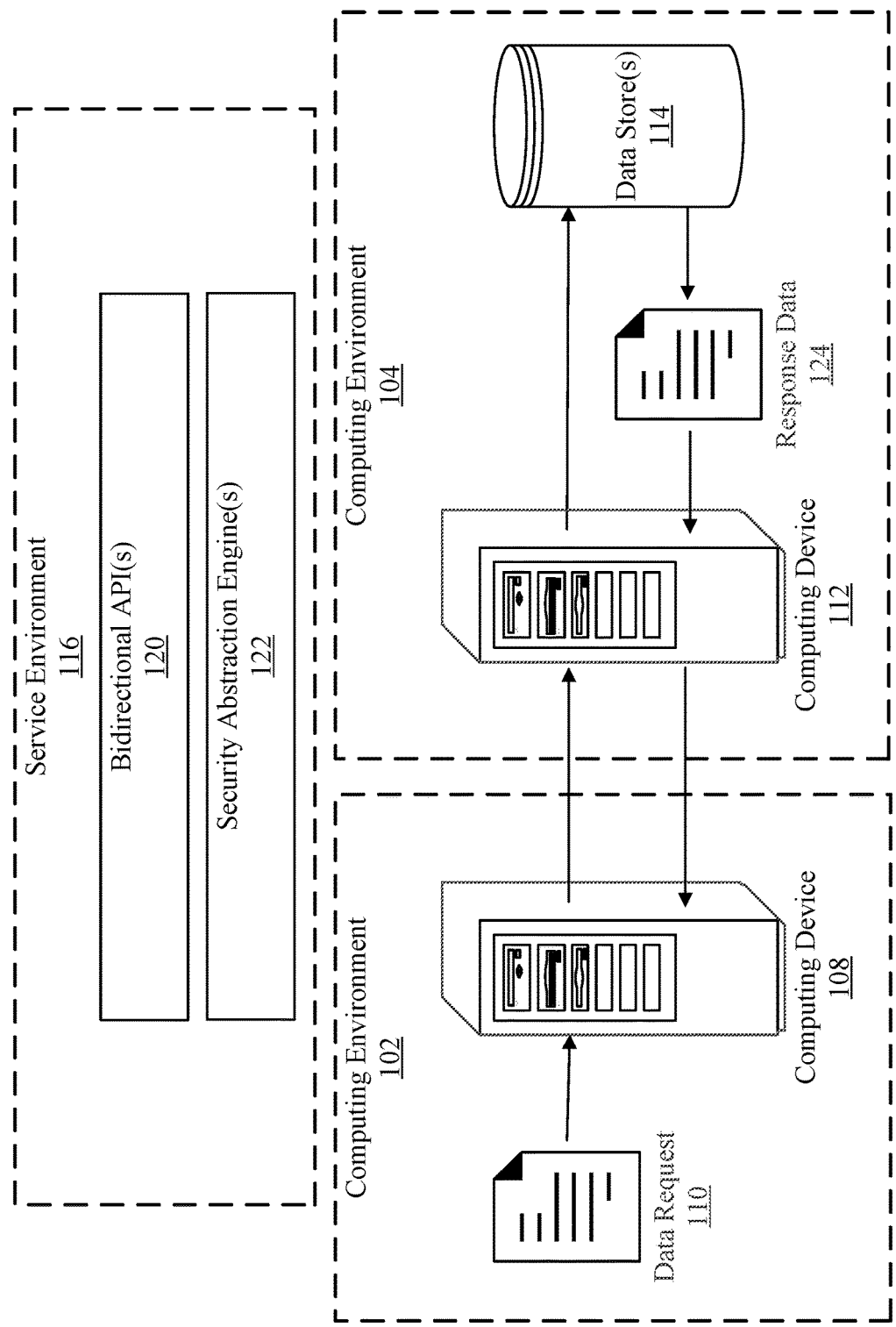
FIG. 1 illustrates an example system for implementing a bidirectional API that enables operational action functionality in an OWT system.

One-way transfer (OWT) systems facilitate the unidirectional transfer of data across one or more data boundaries of the OWT systems. An OWT system refers to a computing system in which one or more endpoints are data diodes configured to ensure that data packets can be transferred only unidirectionally through the computing system. In many cases, OWT systems are used to protect a network or endpoints against outbound data transmissions, malicious inbound data transmissions (e.g., viruses and malware), and cyberattacks. As one example, OWT systems facilitate the transfer of data between computing environments having the same or different security levels (e.g., high-security or low-security), where at least one of the computing environments is low-trust with respect to another of the computing environments. For instance, a first computing environment that is high-trust with respect to the devices of the first computing environment and/or with respect to devices of one or more other computing environments may receive data from a second computing environment that is considered to be low-trust by the first computing environment.

In examples, a high-trust environment refers to a system or network where the devices, applications, and users are considered trustworthy, and security measures are in place to establish and maintain that trust. In this type of environment, the devices and/or parties involved, such as devices, software, and users, are often authenticated, authorized, and/or adhere to established security policies and best practices. High-trust environments usually have rigorous access controls, encryption, and monitoring to ensure that trust is maintained and to minimize the risk of unauthorized access, data breaches, or other security incidents. Devices within high-trust environments may be authorized to access or be accessed by other devices based on security techniques that are implemented by the high-trust environments (e.g., unique encryption keys, secrets, or other cryptographical techniques). For instance, the communications transmitted by a high-trust environment may be considered trustworthy by other computing environments or devices based on the high-trust environment (or devices thereof) being included in an allowlist (e.g., a list of approved devices and/or computing environments). Alternatively, the communications transmitted by a high-trust environment may be considered trustworthy based on a password or credential provided with the communications. In some examples, the devices in a high-trust environment do not require authentication to access or be accessed by other devices. A high-trust environment generally does not expose the security techniques implemented by the high-trust environment to other computing environments, which may be considered low-trust or no-trust environments by the high-trust environment.

By contrast, a low-trust or no-trust environment refers to a system or network where the devices, applications, and/or users are not implicitly trusted or where there is a high risk of unauthorized access or malicious activities. Low-trust or no-trust environments may have limited or no security measures in place, or may include or be connected to one or more external or unmanaged devices. Alternatively or additionally, a low-trust or no-trust environment refers to an environment in which the devices are not considered to be secured or trustworthy by other devices within and/or external to the low-trust or no-trust environments. As the security techniques implemented by the high-trust environment are not exposed to low-trust or no-trust environments, low-trust or no-trust environments may not be able to access or communicate with a high-trust environment without performing various authorization and/or authentication steps that need not be performed by devices in high-trust environments. In examples, an OWT system may span or include multiple computing environments that are separated by one or more boundaries between computing environments of different trust levels and/or security levels.

The data diodes of an OWT system ensure unidirectional data packet transfer through implementation of hardware and/or software components. In one example, a data diode includes a transmit-only network interface card (NIC). A transmit-only NIC transmits data to an endpoint but cannot receive data from the endpoint due to the physical severing of the receive pin on the network controller chip of the transmit-only NIC. The transmit-only NIC may also comprise firmware which sets the link state of the transmit-only NIC to always be "up" (e.g., enabled and/or active). In another example, a data diode implements a standard (e.g., commodity) NIC and a Y-splitter cable. The Y-splitter separates a data transmission signal such that a first cable of the Y-splitter is connected to a receiving device and a second cable of the Y-splitter is directed back to the transmitting device to establish a layer-1 link state. In yet another example, a data diode implements one or more field-programmable gate array (FPGA) devices to ensure a unidirectional dataflow.

Due to the inherent unidirectionality of data transfers in OWT systems, OWT systems do not provide operational action functionality across the data boundaries of the OWT systems. Operational action functionality, as used herein, refers to the ability to transfer, interact with, or manipulate data in a manner that provides a synchronous experience for a user. For example, a source endpoint submits a synchronous transmission of a first dataflow corresponding to a data request to a destination endpoint, and the destination endpoint submits a corresponding synchronous transmission of a second dataflow that is responsive to the data request to the source endpoint. In contrast, OWT systems transmit data requests from a source endpoint in a first computing environment (e.g., a low-trust environment) to a destination endpoint in a second computing environment (e.g., a high-trust environment). The source endpoint cannot track a data request transmitted to the second computing environment, as the source endpoint has limited or no visibility into the second computing environment. When the data request is a synchronous request, the source endpoint cannot receive a response to the data request, as the OWT system does not permit response data to be transmitted from the second computing environment to the first computing environment. Accordingly, the OWT system handles a synchronous data request as an asynchronous data request for which a response is not provided. As a result of this inability of source endpoints to collect response data from the destination endpoints, information relevant to the stored and transferred data, performance, and maintenance of OWT system cannot be securely collected without the collector (or collecting device) being physically present in the second computing environment. This presents a significant obstacle for users (e.g., support teams and administrators) outside of the second environment to maintain the OWT system and to manage the data transferred and stored by the OWT system.

The present disclosure provides a solution to the above-described obstacle of securely collecting relevant information in OWT systems. Embodiments of the present disclosure describe systems and methods for a bidirectional application programming interface (API) that enables secure operational action functionality in an OWT system. In examples, a synchronous data request from a requestor is received by a first bidirectional mechanism in a first computing environment of an OWT system. The data request is associated with an asynchronous first unidirectional dataflow having a dataflow identifier that identifies the data request. In some examples, the transaction identifier is associated with a use case that describes a user objective or a specific scenario for the data request. For instance, a first use case may be associated with requesting a first set or type of data and a second use case may be associated with requesting a second set or type of data. The first bidirectional mechanism facilitates transfer of the first unidirectional dataflow through the first computing environment.

A first set of policies associated with the first computing environment is applied to the data request to ensure that the relevant security policies associated with transferring data and data requests via the first computing environment are enforced. The first set of policies comprise or represent operations to be performed on data during a data transfer. Examples of policies in the first set of policies include antivirus scanning policies, watch word detection policies, data hashing policies, digital signature policies, and file type checking and routing policies, code validation policies, content sanitization policies, schema validation policies, and video transcoding policies. In examples, the first set of policies is applied to the data request using a first security abstraction engine implemented in the first computing environment. A security abstraction engine refers to a software component that enforces rules or policies relating to the access and functionality of data, device resources, and network resources. The security abstraction engine is cloud-scale deployable, does not rely on specialized or export-controlled hardware, and abstracts customer-specific implementations of security controls. The security abstraction engine provides a reliable initial codebase that can be configured to meet individual customer needs and uses software-defined networking that is not accessible to customers or third parties to enforce a unidirectional dataflow.

After applying the first set of policies, the data request is transferred to a second computing environment of the OWT system as part of the first unidirectional dataflow. The first computing environment and the second computing environment are separated by at least one security boundary of the OWT system using, for example, boundary protection devices (e.g., gateways, routers, firewalls, guards, and encrypted tunnels). In some examples, a second set of policies associated with the second computing environment is applied to the data request to ensure that the relevant security policies associated with data and data requests transferred to the second computing environment are enforced. In such examples, the second set of policies is applied to the data request using a second security abstraction engine implemented in the second computing environment.

The data request is provided to a second bidirectional mechanism in the second computing environment to complete the first unidirectional dataflow. The second bidirectional mechanism retrieves response data for the data request from one or more data sources accessible to the second computing environment as part of an asynchronous second unidirectional dataflow. Alternatively, the first unidirectional dataflow is completed and the second unidirectional dataflow is initiated after the second bidirectional mechanism retrieves the response data. In either scenario, the transaction identifier of the first unidirectional dataflow is assigned to or otherwise associated with the second unidirectional dataflow. In some examples, at least one of the data sources is located in a computing environment external to the second computing environment, such as a third computing environment in the OWT system or a computing environment external to the OWT system. In at least one example, a third set of policies associated with the second computing environment is applied to the response data to ensure that the relevant security policies associated with transferring data and data requests via the second computing environment are enforced. The third set of policies is applied to the response data using a third security abstraction engine implemented in the second computing environment.

The response data is transferred to the first computing environment of the OWT system as part of the second unidirectional dataflow. In some examples, a fourth set of policies associated with the first computing environment is applied to the response data to ensure that the relevant security policies associated with data and data requests transferred to the first computing environment are enforced. In such examples, the fourth set of policies is applied to the response data using a fourth security abstraction engine implemented in the first computing environment. The response data is provided to the first bidirectional mechanism in the first computing environment to complete the second unidirectional dataflow. The first bidirectional mechanism then provides the response data to the requestor based on the transaction identifier to fulfill the data request. For example, the first bidirectional mechanism matches the transaction identifier in the data request to the transaction identifier in the response data to determine that the response data is related to the data request. As such, employing the first and second bidirectional mechanisms in the OWT system enables operational action functionality by effectively providing synchronous command functionality between data boundaries of the OWT system using two asynchronous one-way transactions that are related by a common transaction identifier. Such operational action functionality is transparent to the data requestor, thus providing a seamless, synchronous user experience.

The operational action functionality also enables response data transferred between various computing environments to be filtered or modified in accordance with the different security policies and requirements of the requesting computing environment. The different security policies and requirements may cause the response data to include different attributes when provided to different devices or components of the requesting computing environment. As one example, a first instance of a computing environment that implements a first set of policies submits a data request that results in response data that includes a user (e.g., an employee) record comprising a globally unique identifier (GUID). A second instance of the computing environment that implements a second set of policies submits the same data request, which results in response data that includes the employee record comprising the globally unique identifier (GUID) and an email address. A third instance of the computing environment that implements a third set of policies submits the same data request, which results in response data that includes the employee record comprising an employee name.

FIG. 1 illustrates an example system for implementing a bidirectional application programming interface (API) that enables operational action functionality in an OWT system. System 100, as presented, is a combination of interdependent components that interact to form an integrated whole. Components of system 100 may be hardware components or software components (e.g., APIs, modules, runtime libraries) implemented on and/or executed by hardware components of system 100. In one example, components of system 100 are distributed across multiple processing devices or computing systems.

In FIG. 1, system 100 represents an OWT system for transmitting data between different computing environments. System 100 comprises computing environments 102 and 104 and service environment 116. In examples, computing environments 102 and 104 are implemented in a cloud computing environment or another type of distributed computing environment and are subject to one or more distributed computing models/services (e.g., Infrastructure as a Service (IaaS), Platform as a Service (PaaS), Software as a Service (SaaS), Functions as a Service (FaaS)). In some examples, service environment 116 is implemented locally in one or more of computing environments 102 and 104. For instance, one or more computing devices in computing environments 102 and/or 104 may each comprise a separate instance of service environment 116. In other examples, service environment 116 is implemented separately from one or more of computing environments 102 and 104. For instance, service environment 116 may be implemented in a cloud computing environment that is remotely accessible by computing environments 102 and/or 104 via a network, such as a private area network (PAN), a local area network (LAN), or a wide area network (WAN).

Although FIG. 1 is depicted as comprising a particular combination of computing environments and devices, the scale and structure of devices and computing environments described herein may vary and may include additional or fewer components than those described in FIG. 1. Further, although examples in FIG. 1 and subsequent figures will be described in the context of OWT systems and data transfers between low-security computing environments and high-security computing environments, the examples are equally applicable to non-OWT systems and data transfers between computing environments of various (or the same) types and security levels. Moreover, the examples are equally applicable data transfers between components of a single device. For instance, the bidirectional API may be implemented on a single device having containers (e.g., software data structures for storing data and data objects) with different policies and access privileges to ensure that network traffic received by one of the containers (e.g., a high-security container) cannot be accessed by another of the containers (e.g., a low-security container).

With respect to FIG. 1, computing environment 102 represents a low-security computing environment in which computing environment 102 is untrusted by computing environment 104 (e.g., devices executing within computing environment 102 are not trusted by devices executing within computing environment 104). In such examples, computing environment 102 may be physically separated from computing environment 104 such that computing environment 102 is in a first physical location (e.g., region, building, or room) and computing environment 104 is in a different second physical location. Alternatively, computing environment 102 and computing environment 104 may share the same physical location.

Computing environment 102 comprises computing device 108. Examples of computing device 108 include data diodes and server devices, such as web servers, file servers, application servers, and database servers. Computing device 108 receives input, such as data request 110, from users or computing devices within or accessible to computing environment 102. Data request 110 may comprise or request one or more types of data (e.g., audio data, touch data, text-based data, gesture data, and/or image data), computing instructions (e.g., commands or operations), and/or data items (e.g., document or files). As one example, data request 110 may request data stored by system 100 or data relating to one or more components or services of system 100 (e.g., health or performance data). As another example, data request 110 may cause a report to be generated or a maintenance operation to be performed. As yet another example, data request 110 may include a document or file to be stored or processed. Data request 110 is associated with a transaction identifier that identifies a use case, a transaction, or a source identifier (e.g., an identifier for computing device 108, a component of computing device 108, or a source endpoint that provided the data to computing device 108) associated with data request 110. The transaction identifier is included in (e.g., embedded in or appended to) data request 110.

In response to receiving data request 110, computing device 108 may access service environment 116. In examples, service environment 116 provides access to various computing services and resources (e.g., applications, devices, storage, processing power, networking, analytics, intelligence). In FIG. 1, service environment 116 comprises bidirectional API(s) 120 and security abstraction engine(s) 122. One or more bidirectional API(s) 120 and/or one or more security abstraction engine(s) 122 may serve each of computing environments 102 and 104. For instance, a first bidirectional API 120 and a first security abstraction engine 122 may be associated with a data ingress action by computing environment 102 (e.g., a data transfer from computing environment 102 to computing environment 104) and a second bidirectional API 120 and a second security abstraction engine 122 may be associated with a data egress action by computing environment 104 (e.g., a data transfer from computing environment 104 to computing environment 102).

Bidirectional API(s) 120 serve as a front-end layer for sending and retrieving data across multiple computing environments of system 100. Bidirectional API(s) 120 abstract the data transfer process such that a user submitting a data request perceives a data request dataflow and a corresponding response dataflow as a single bidirectional transaction. As such, bidirectional API(s) 120 effectively provide asynchronous command functionality between data boundaries of system 100. In some examples, bidirectional API(s) 120 provide or are associated with a user interface that enables uses to generate and submit a data request. For instance, computing devices 108 and/or 112 may provide a graphical user interface (GUI) that enables users to specify or select data to be retrieved from one or more data sources accessible to computing environments 102 and/or 104. In other examples, bidirectional API(s) 120 receive a data request that has been submitted to computing devices 108 and/or 112 via a different component or device of computing environments 102 and 104.

Bidirectional API(s) 120 maintain a record of the transaction identifier that identifies data request 110. For instance, bidirectional API(s) 120 may store the transaction identifier in a data structure (e.g., a database or a memory table) that correlates the transaction identifier to data request 110, a user, a user device, a user account, and/or a user session. In examples, bidirectional API(s) 120 apply routing information to data request 110 to enable data request 110 to be transmitted across the boundaries of one or more computing environments. The routing information includes an Internet Protocol (IP) address, a Media Access Control (MAC) address, a Uniform Resource Locator (URL), and/or a device port. In some examples, the routing information is based on the transaction identifier. For instance, the transaction identifier may be stored in a routing table that correlates the transaction identifier to a specific destination address or data source identifier. In such an example, bidirectional API(s) 120 use the transaction identifier for data request 110 to identify the corresponding destination information in the routing table. The routing information is applied to data request 110 based on the destination information. Bidirectional API(s) 120 then provide data request 110 to security abstraction engine(s) 122 as part of a first unidirectional dataflow.

Security abstraction engine(s) 122 is a software engine that abstracts security controls of hardware components that have traditionally been dedicated for policy enforcement. In examples, security abstraction engine(s) 122 applies a set of policies to data request 110. Applying the first set of policies includes executing one or more operations associated with the first set of policies on data request 110. Each operation may be a set of executable instructions that is executed by security abstraction engine(s) 122 serially or in parallel with other operations. The set of policies includes policies that dictate the data content and types of data that may be provided to and/or received from computing environments 102 and 104. Such policies may include antivirus scanning, watch word detection, data hashing, digital signature creation/validation, file type checking and routing, code validation (e.g., source code and compiled code validation), data sanitization, schema validation (e.g., file schema and data schema validation), and/or video and audio transcoding. In a specific example, the set of policies includes a schema validation policy that describes and validates the structure and content of XML documents.

Each of the security abstraction engine(s) 122 may provide the same set of policies. Alternatively, one or more security abstraction engine(s) 122 may apply fewer, additional, or different policies that the other security abstraction engine(s) 122. For instance, security abstraction engine(s) 122 associated with computing environment 102 may apply a first set or type of policies and security abstraction engine (s) 122 associated with computing environment 104 may apply a second set or type of policies. The first set or type of policies may be more restrictive or less restrictive than the second set or type of policies. Additionally, security abstraction engine(s) 122 associated with a first unidirectional dataflow (e.g., an ingress dataflow) may apply a first set or type of policies and security abstraction engine(s) 122 associated with a second unidirectional dataflow (e.g., an egress dataflow) may apply a second set or type of policies.

In some examples, security abstraction engine(s) 122 evaluates policies applied to data request 110 by other components of system 100. For instance, service environment 116 may further comprise a policy engine (not shown) that is different from security abstraction engine(s) 122. A policy engine is a software engine that applies policies to data transmitted using system 100. The policy engine may apply one or more policies in the set policies to data request 110 or apply different policies to data request 110. In such examples, security abstraction engine(s) 122 evaluates the policies applied by the policy engine. For instance, security abstraction engine(s) 122 may evaluate digital signatures created for each policy or operation applied to data request 110 by the policy engine. Evaluating the digital signatures comprises comparing the digital signatures (or attributes of the digital signatures) to expected digital signatures (or expected attributes of the digital signatures) for policies applied by the policy engine to determine whether the digital signatures are valid.

Security abstraction engine(s) 122 may comprise various policy enforcement components for implementing the set of policies. Each of these policy enforcement components may represent a different, dedicated hardware device that is used for policy enforcement in conventional policy enforcement systems. In one example, security abstraction engine(s) 122 implement a code processing function, a complex document processing function, and a video processing function. The code processing function is assigned to process software artifacts, such as software libraries, executable files, software builds, and the like. The code processing function validates that content included in data request 110 is a particular type (e.g., a software artifact type) and may perform additional functions, such as compiling source code, validating code, or generating a digital signature for a file. The complex document processing function is assigned to process complex documents, which refers to a document that includes document objects other than text and/or images (e.g., charts, tables, macros, and other executable content), such as PDF documents, XML, documents, presentation documents, spreadsheet documents, and the like. The complex document processing function performs content standardization, such as removing content (e.g., macros and images) from data request 110 and reformatting the content of data request 110. The video processing function is assigned to process video data, such as video files or streams. The video processing function processes video content (e.g., modifies aspect ratio, frame rate, color, and other attributes of the video content) and transcodes content included in data request 110 using one or more data compression and data decompression utilities, such as a codec.

After applying the set of policies to data request 110, security abstraction engine(s) 122 transmits data request 110 to computing environment 104 based on the transaction identifier. For instance, routing information associated with the transaction identifier may be used to identify one or more devices or locations in computing environment 104. In examples, computing environment 104 represents a higher-security computing environment with respect to computing environment 102. Computing environment 104 comprises computing device 112. Examples of computing device 112 include those devices described above with respect to computing device 108. In some examples, computing device 112 is located proximate to computing device 108 (e.g., in the same building or room). For instance, computing device 112 and computing device 108 may be located in the same room of a data center such that computing device 108 is located in a first data rack (e.g., server rack or data cabinet) and the computing device 112 is located in a second data rack or a different shelf of the first data rack. In such an example, computing device 108 and computing device 112 may be directly connected via point-to-point cabling. In other examples, computing device 112 is located remotely from computing device 108 (e.g., in a different building or room).

In FIG. 1, computing device 108 provides data request 110 to computing device 112. In other examples, security abstraction engine(s) 122 provides data request 110 to computing device 112 or to a bidirectional API(s) 120 associated with computing environment 104. In either scenario, the first unidirectional dataflow for data request 110 may terminate when computing device 112 or the bidirectional API(s) 120 associated with computing environment 104 receive data request 110. Alternatively, the first unidirectional dataflow for data request 110 may terminate after computing device 112 or the bidirectional API(s) 120 have performed one or more processing steps for data request 110. For instance, the transaction identifier for data request 110 may be identified and recorded in a temporary memory table.

In response to receiving data request 110, computing device 112 or bidirectional API(s) 120 accesses data store(s) 114. In some examples, the accessing of data store(s) 114 initiates or is part of a second unidirectional dataflow that is separate from, but related to, the first unidirectional dataflow. Data store(s) 114 comprise various documents, files, applications, services, and/or other data resources. Examples of data store(s) 114 include direct-attached storage devices (e.g., hard drives, solid-state drives, and optical disk drives), network-based storage devices (e.g., storage area network (SAN) devices and network-attached storage (NAS) devices), and other types of memory devices. Although data store(s) 114 are depicted in FIG. 1 as being included in computing environment 104, one or more data store(s) 114 may be located external to computing environment 104.

Data store(s) 114 provide response data 124 associated with data request 110 to computing device 112 or bidirectional API(s) 120. For instance, response data 124 may include one or more data items. Alternatively, response data 124 may comprise a completion status (e.g., success, failure, in progress) or an acknowledgement (e.g., request received) of one or more requested actions associated with data request 110. Computing device 112 or bidirectional API(s) 120 associate response data 124 to the transaction identifier of data request 110. For example, the transaction identifier is embedded in or appended to response data 124. Computing device 112 or bidirectional API(s) 120 then transmit response data 124 to security abstraction engine(s) 122 based on the transaction identifier as part of the second unidirectional dataflow. For instance, bidirectional API(s) 120 may access a data structure (e.g., a database or a memory table) that correlates the transaction identifier to routing information that specifies a specific destination address or data source identifier. Bidirectional API(s) 120 applies the routing information to response data 124 to enable response data 124 to be transmitted to a destination beyond computing environment 104.

The security abstraction engine(s) 122 may apply a set of policies to response data 124, as discussed above, and transmit response data 124 to computing device 108 or to bidirectional API(s) 120 associated with computing environment 102. In computing environment 102, the transaction identifier associated with response data 124 is matched to the transaction identifier of data request 110. For example, the transaction identifier associated with response data 124 is identified and used to search a routing table for a corresponding transaction identifier that is associated with a data request (e.g., data request 110). Upon identifying a matching transaction identifier in the routing table, response data 124 is provided in response to the data request 110. For instance, response data 124 is provided to the requestor of data request 110 to fulfill data request 110 and to terminate the second unidirectional dataflow.

Figure 2:
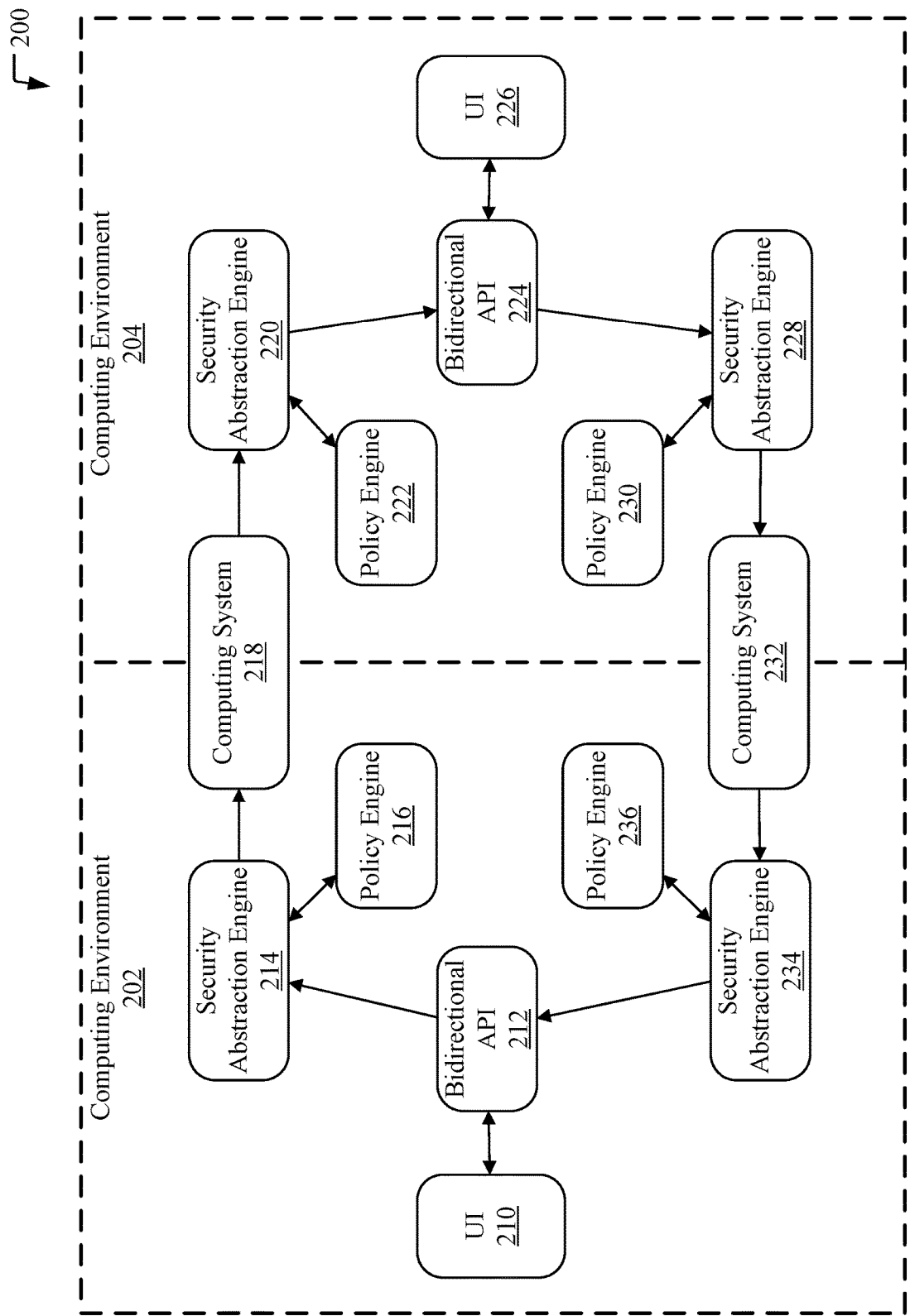
FIG. 2 illustrates an example process flow for fulfilling a data request using a bidirectional API that enables operational action functionality.

FIG. 2 illustrates an example process flow for fulfilling a data request using a bidirectional API that enables operational action functionality. In examples, process flow 200 is performed using an OWT system comprising two or more computing environments, such as computing environments 202 and 204, that are each separated by one or more data boundaries of the OWT system. Computing environments 202 and 204 are similar in type and implementation to computing environments 102 and 104, respectively, of FIG. 1. For instance, computing environment 202 may represent a commercial computing environment that is publicly accessible and computing environment 204 may represent a sovereign computing environment that stores data for an entity (e.g., a user, and organization, or a country) such that the data is in compliance with local laws or policies of the entity and is only accessible by the entity (or by particular members authorized by the entity).

In process flow 200, user interface (UI) 210 of computing environment 202 receives a data request associated with computing environment 204. UI 210 may be provided by a computing device in or external to computing environment 204, such as computing device 108. In examples, UI 210 enables users to generate and submit data requests to retrieve data from and/or perform tasks in computing environments 202 and 204. UI 210 may also provide data presentations and manipulation functionality (e.g., graphing, reporting, data creation or modification) and provide access to one or more data stores. For instance, UI 210 may have access to a data store comprising performance data (e.g., CPU metrics, memory metrics, disk storage metrics, input/output (I/O) operation metrics) for one or more devices, services, or applications accessible to computing environment 202.

In examples, UI 210 performs one or more processing steps on the data request. For instance, UI 210 associates the data request with a transaction identifier that indicates a data transfer use case (e.g., retrieve data from or send data to a particular computing environment or type of computing environment, schedule a task or an event, perform a task for a particular entity), a dataflow type (e.g., an ingress dataflow or an egress dataflow), a source identifier, and/or a destination identifier. The transaction identifier may be automatically applied to the data request upon creation or receipt of the data request. UI 210 also applies one or more annotations and/or metadata to the data request (e.g., source and destination identity and routing information, expected response data type, state information associated with the data request or a current user session). For instance, UI 210 may apply a message wrapper comprising message header information and routing information for components in computing environments 202 and/or 204 to the data request.

UI 210 transmits the data request to bidirectional API 212, which is similar in functionality to bidirectional API(s) 120 of FIG. 1. Upon receiving the data request, bidirectional API 212 initiates a first unidirectional dataflow for the data request. As part of the first unidirectional dataflow, bidirectional API 212 maintains information that correlates the data request to the transaction identifier for the data request. For instance, bidirectional API 212 may store a record that correlates the transaction identifier to connection information (e.g., a connection and port combination) for a device providing UI 210. In some examples, the connection to UI 210 (and/or a corresponding user session) remains open while the data request is transmitted to a destination to facilitate a synchronous data transfer experience. In other examples, the connection to UI 210 (and/or a corresponding user session) is closed after the data request is provided to bidirectional API 212 to facilitate an asynchronous data transfer experience.

Bidirectional API 212 may assign higher order routing information to the data request based on the transaction identifier. For instance, bidirectional API 212 may wrap the data request (or the message wrapper for the data request) in a message wrapper that comprises routing information for a destination or a component of computing environments 202 or 204. The routing information applied by bidirectional API 212 may be similar to or the same as the routing information applied by UI 210, thereby leveraging the routing information applied by UI 210. Bidirectional API 212 transmits the data request to security abstraction engine 214, which is similar in functionality to security abstraction engine(s) 122 of FIG. 1 and to security abstraction engines 220, 228, and 234.

Security abstraction engine 214 applies a first set of policies to the data request. The first set of policies dictates the request content (e.g., data content, types of documents, types of data requests, and/or types of task requests) that may be transmitted from computing environment 202 to computing environment 204. For instance, the first set of policies may include policies for antivirus scanning, watch word detection, data hashing, digital signature creation/validation, file type checking and routing, code validation (e.g., source code and compiled code validation), data sanitization, schema validation (e.g., file schema and data schema validation), and/or video and audio transcoding. As a result of applying the first set of policies, content in the data request may be removed, added, or modified. Alternatively, the data request may be terminated or divided into one or more sub-requests.

In some examples, policy engine 216 provides one or more policies in the first set of policies to security abstraction engine 214. Policy engine 216, which is similar in functionality to policy engines 216, 230, and 236, is a compliance analyzer and rule engine that provides a user interface for building static rules and policies and machine learning (ML)-based rules and policies. The policy engine 216 may provide policies to security abstraction engine 214 in accordance with a time interval (e.g., hourly, daily, or sporadically) or based on a specified event (e.g., detecting a new data request or a restart of component in computing environment 202). Security abstraction engine 214 then adds one or more of the policies provided by policy engine 216 to the first set of policies stored or accessible to security abstraction engine 214. In other examples, policy engine 216 applies one or more policies in the first set of policies to the data request. For instance, bidirectional API 212 may provide the data request to policy engine 216 prior to the data request being provided to security abstraction engine 214. Alternatively, security abstraction engine 214 may provide the data request to policy engine 216. In either scenario, policy engine 216 applies policies to the data request and provides the data request to security abstraction engine 214 for further transmission.

In examples, security abstraction engine 214 and/or policy engine 216 identifies the first set of policies to be applied to the data request based on the transaction identifier. As one example, a data structure (e.g., a data table, data array, or a data mapping) stores correlations between respective transaction identifiers, sets of policies, and/or source identifiers. Each transaction identifier in the data structure may be associated with a different use case and a different set of policies. The security abstraction engine 214 and/or policy engine 216 uses the transaction identifier in the data request to identify a matching transaction identifier in the data structure. The first set of policies is then identified based on the correlation between the transaction identifier in the data structure and the first set of policies in the data structure.

After applying the first set of policies to the data request, security abstraction engine 214 transmits the data request to computing system 218. Computing system 218 comprises one or more computing devices, such as computing devices 108 and 112 of FIG. 1. Computing system 218 transmits the data request from computing environment 202 to security abstraction engine 220 in computing environment 204. In some examples, security abstraction engine 220 applies a second set of policies to the data request. The second set of policies dictates the request content that may be received from computing environment 202 and/or transmitted to bidirectional API 224. The second set of policies may include one or more of the policies or the types of policies in the first set of policies. Policy engine 222 may provide one or more policies in the second set of policies to security abstraction engine 220 and/or apply policies to the data request, as discussed above with respect to security abstraction engine 214 and policy engine 216. In at least one example, security abstraction engine 220 does not apply a second set of policies to the data request.

Security abstraction engine 220 transmits the data request to bidirectional API 224, which is similar in functionality to bidirectional API 212. Bidirectional API 224 unwraps (e.g., removes one or more message wrappers from) the data request to identify a destination associated with the data request. As one example, the data request may indicate a data store, application, or service in or accessible to computing environment 204. Bidirectional API 224 submits the data request to UI 226, which is similar in functionality to UI 210. UI 226 accesses the destination identified by the data request to retrieve the requested data or perform (or cause the performance of) the requested action. Upon retrieving the response data (e.g., the requested data or a completion status of the requested action), UI 226 performs one or more processing steps on the response data. For instance, UI 226 associates the response data with the transaction identifier associated with the data request. Associating the response data with the transaction identifier comprises retrieving the data request and applying (e.g., appending or embedding) the transaction identifier to the response data. In some examples, UI 226 applies one or more annotations and/or metadata to the response data and applies a message wrapper comprising message header information and routing information for components in computing environments 202 and/or 204 to the response data. In at least one example, the routing information for the response data is a selected based on the transaction identifier. For instance, UI 226 and/or bidirectional API 224 may have access to a data structure that stores correlations between transaction identifiers and corresponding routing information (e.g., a connection and port combination) for a device providing UI 210.

UI 226 provides the response data to the bidirectional API 224. In some examples, the first unidirectional dataflow terminates when bidirectional API 224 receives the response data from UI 226. In other examples, the first unidirectional dataflow terminates when bidirectional API 224 receives the data request from security abstraction engine 220. In either scenario, bidirectional API 224 initiates a second unidirectional dataflow to provide the response data to a requestor in fulfillment of the data request.

Upon receiving the response data, bidirectional API 224 may assign higher order routing information to the response data based on the transaction identifier, as discussed above, to leverage routing information applied by UI 226. Bidirectional API 224 transmits the response data to security abstraction engine 228. Security abstraction engine 228 applies a third set of policies to the response data. The third set of policies dictates the response content (e.g., data content, types of documents, and/or types of responses) that may be transmitted from computing environment 204 to computing environment 202. For instance, the third set of policies may include policies defining authorized recipients and authorized data transmission days/times in addition to, or instead of, the policies included in the first and/or second set of policies. As a result of applying the third set of policies, content in the response data may be removed, added, or modified. Alternatively, the response data may be deleted or divided into one or more sub-responses. Policy engine 230 may provide one or more policies in the third set of policies to security abstraction engine 228 and/or apply policies to the response data, as discussed above with respect to security abstraction engine 214 and policy engine 216.

After applying the third set of policies to the response data, security abstraction engine 228 transmits the response data to computing system 232. Computing system 232 is similar in functionality to computing system 218. Computing system 232 transmits the data request from computing environment 204 to security abstraction engine 234 in computing environment 202. In some examples, security abstraction engine 234 applies a fourth set of policies to the response data. The fourth set of policies dictates the response content that may be received from computing environment 204 and/or transmitted to bidirectional API 212. The fourth set of policies may include one or more of the policies or the types of policies in the third set of policies. Policy engine 236 may provide one or more policies in the fourth set of policies to security abstraction engine 234, as discussed above with respect to security abstraction engine 214 and policy engine 216. In at least one example, security abstraction engine 234 does not apply a fourth set of policies to the response data.

Security abstraction engine 234 transmits the response data to bidirectional API 212. Bidirectional API 212 unwraps (e.g., removes one or more message wrappers from) the response data request to identify a destination associated with the response data. The response data indicates a user, computing device, or storage location to which the response will be provided. For instance, the response data may indicate connection information for a device providing UI 210. In some examples, bidirectional API 212 transmits the response data using an open connection to UI 210 such that the data request is fulfilled in a synchronous manner. For instance, bidirectional API 212 may transmit the response data to UI 210 using a connection (and/or a user session) that remained open after being used to submit the data request from UI 210 to bidirectional API 212. In such examples, bidirectional API 212 may identify the open connection based on the transaction identifier. For instance, the transaction identifier in the response data may be matched to a transaction identifier associated with the open connection to determine that the open connection is to be used to transmit the response data to UI 210. In other examples, bidirectional API 212 transmits the response data to UI 210 such that the data request is fulfilled in an asynchronous manner. For instance, bidirectional API 212 opens a new connection to UI 210 based on the routing information for the response data and transmits the response data to UI 210 using the new connection.

UI 210 receives the response data from bidirectional API 212 and provides the response data to a requestor of the data request. In some examples, the second unidirectional dataflow terminates when UI 210 provides the response data to the requestor. In other examples, the second unidirectional dataflow terminates when UI 210 receives the response data from bidirectional API 212. In either scenario, using the first unidirectional dataflow and the separate second unidirectional dataflow (as opposed to using a single bidirectional dataflow) enables operational action functionality across the data boundaries of the OWT system.

Having described a system that may be employed by the embodiments disclosed herein, a method that may be performed by such systems is now provided. Although method 300 is described in the context of system 100 of FIG. 1 and process flow 200 of FIG. 2, the performance of method 300 is not limited to such examples.

Figure 3:
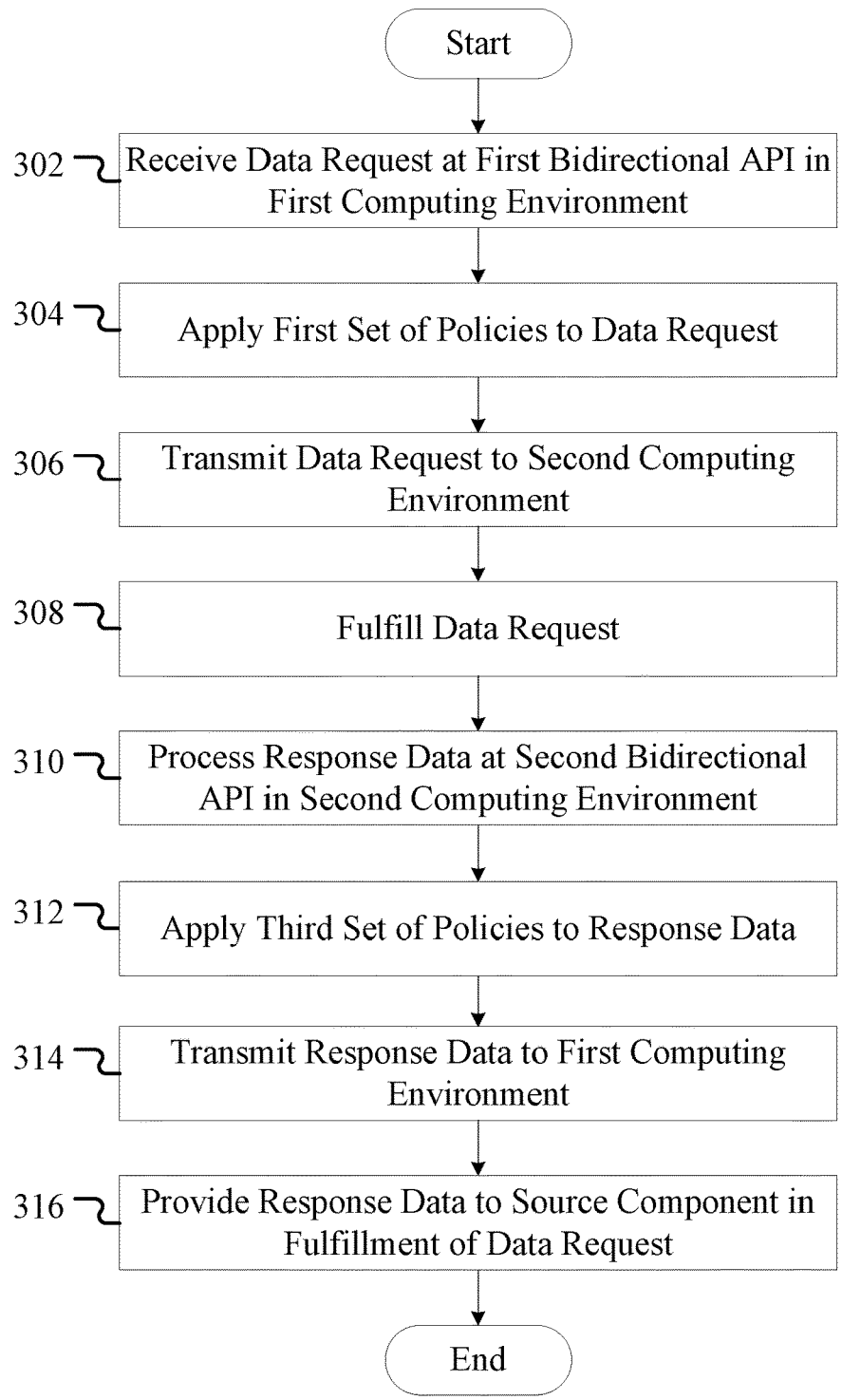
FIG. 3 illustrates an example method for using a bidirectional API to transmit and receive data in an OWT system.

FIG. 3 illustrates a method 300 for using a bidirectional API to transmit and receive data in an OWT system. In examples, the bidirectional API is implemented in an OWT system that comprises multiple computing environments. One or more of the computing environments may differ in security level or physical location. For instance, one of the computing environments may be a low-security environment and another of the computing environments may be a high-security environment. The OWT system may be configured such that a source endpoint and/or a destination endpoint of data transmitted through the OWT is unknown to one or more of the computing environments.

Method 300 begins at operation 302, where a data request, such as data request 110, is received at a first bidirectional API, such as bidirectional API(s) 120. Receiving the data request at the first bidirectional API initiates a first unidirectional dataflow. The first bidirectional API is implemented in or provided by a first device, such as computing device 108, that is located in a first computing environment of an OWT system, such as computing environment 102. In examples, the data request includes one or more types of data (e.g., audio data, touch data, text-based data, gesture data, and/or image data), computing instructions (e.g., commands or operations), and/or data items (e.g., document or files). The data request may indicate data to be retrieved or one or more actions to be performed (e.g., schedule a task, generate a notification, execute a file or set of commands). The data request is associated with a transaction identifier that is included in (e.g., embedded in or appended to) the data request. In some examples, upon receiving the data request, the first bidirectional API applies the transaction identifier to the data request. In other examples, the transaction identifier is applied to the data request prior to being received by the first bidirectional API. For instance, an interface used to generate the data request, such as UIs 210 and 226, may assign the transaction identifier to the data request as part of generating the data request.

In at least one example, the first bidirectional API maintains a record of the transaction identifier by storing the transaction identifier in a first data structure that correlates the transaction identifier to the data request. The first data structure may also correlate the transaction identifier to a user case, connection information (e.g., IP address and port information for an open or closed connection to the first bidirectional API), or a source identifier for a user (e.g., username or user account number), a user device (e.g., device name or MAC address), or a user object (e.g., a container or storage location associated with the user). In such an example, the first bidirectional API applies routing information associated with the transaction identifier to the data request to enable the data request to be transmitted across the data boundaries of an OWT system. The transaction identifier may be associated with a use case that specifies routing information for performing the use case. For instance, the use case may specify a source address for a data requestor, a destination address for a data store or service having access to the requested data, and/or an address for one or more intermediate destinations (e.g., addresses for security abstraction engines, policy engines, computing systems, bidirectional APIs). In examples, applying the routing information to the data request includes applying a message wrapper to the data request and including the routing information in the message wrapper.

At operation 304, a first set of policies is applied to the data request. In examples, the first bidirectional API provides the data request to a first security abstraction engine, such as security abstraction engine(s) 122. The first security abstraction engine identifies a first set of policies to apply to the data request based on the transaction identifier. For example, the first security abstraction engine may search a second data structure that correlates the transaction identifier to a first set of policies and/or to a policy engine that provides policies associated with the transaction identifier. The first set of policies includes policies that dictate the data content, types of files, and types of task requests that may be transmitted from the first computing environment. For example, the first set of policies may include policies for antivirus scanning, watch word detection, data hashing, digital signature creation/validation, file type checking and routing, code validation, data sanitization, schema validation, and/or video and audio transcoding. The first security abstraction engine applies the identified first set of policies to the data request by executing one or more operations associated with the first set of policies on the data request. Each operation may be a set of executable instructions that is executed serially or in parallel with other operations. In one example, digital signatures are generated for each policy or operation to verify that the policy or operation has been successfully executed.

At operation 306, the data request is transmitted to a second computing environment of the OWT system, such as computing environment 104. In examples, the first security abstraction engine provides the data request to a first computing system, such as computing system 218. The first computing system transmits the data request to the second computing environment based on the routing information. For instance, a computing device in the first computing system identifies the transaction identifier or the routing information in the message wrapper of the data request. The computing device then transmits the data request to a computing device or a component in the second computing environment based on the transaction identifier or the routing information.

In some examples, the first computing system transmits the data request to a second security abstraction engine. The second security abstraction engine identifies a second set of policies to apply to the data request based on the transaction identifier, as discussed above. The second set of policies includes policies that dictate the data content, types of files, and types of task requests that may be received from the first computing environment or transmitted by the second computing environment. For example, the second set of policies may include those policies in the first set of policies. The second security abstraction engine applies the second set of policies to the data request and transmits the data request to a second bidirectional API. In other examples, the first computing system transmits the data request directly to the second bidirectional API.

At operation 308, the data request is fulfilled. In examples, the second bidirectional API processes the data request to identify a destination from which to retrieve data or to be accessed to perform a task associated with the data request. Processing the data request includes unwrapping the data request (e.g., removing one or more message wrappers from the data request) to identify a destination for the data request. The destination may be a storage location, such as data store(s) 114, a service or an application, or an interface, such as UI 226. In at least one example, one or more destinations associated with a data request are external to the second computing environment. The second bidirectional API accesses the destination and performs one or more actions associated with the data request. As one example, the second bidirectional API executes a search query in a database for terms or documents indicated by the data request. As another example, the second bidirectional API causes a service or an application to store data provided in the data request. As yet another example, the second bidirectional API causes a source code file provided in or indicated by the data request to be compiled and/or deployed to a secure environment.

In response to performing an action associated with the data request, the second bidirectional API receives response data associated with the data request from the destination. In examples, the response data includes one or more data items, references to data items, completion statuses, and/or other data and metadata relating to the data request (e.g., data request metrics, data item metadata, data request modifications). For instance, in addition to comprising a set of documents, response data may include metadata for the set of documents (e.g., document creation date, document size, document author), an indication of one or more documents that were omitted from the response data, and an explanation regarding the omission of the documents (e.g., the requestor is not authorized to access the documents, the destination or the second computing environment does not allow the documents to be transmitted beyond the boundaries of the second computing environment, the data request was modified during transit to the second bidirectional API). Upon receiving the response data at the second bidirectional API, the first unidirectional dataflow terminates.

At operation 310, the second bidirectional API processes the response data. In examples, the second bidirectional API initiates a second unidirectional dataflow for providing the response data to the requestor by performing one or more processing step on the response data. As one example, the second bidirectional API associates the transaction identifier for the data request with the response data. For instance, the transaction identifier may be appended to or embedded within the response data. The second bidirectional API applies routing information associated with the transaction identifier to the response data to enable the response data to be transmitted across the data boundaries of the OWT system. For instance, the second bidirectional API may access a third data structure that comprises correlations between transaction identifiers and routing information for destinations associated with the transaction identifiers. In examples, applying the routing information to the response data includes applying a message wrapper to the response data and including the routing information and/or the transaction identifier in the message wrapper.

At operation 312, a third set of policies is applied to the response data. In examples, the second bidirectional API provides the response data to a third security abstraction engine. The third security abstraction engine identifies a third set of policies to apply to the response data based on the transaction identifier, as discussed above. The third set of policies includes policies that dictate the data content and types of files that may transmitted from the second computing environment to particular users or computing environments. For instance, the third set of policies may dictate that restricted data (e.g., user medical data) is not authorized to be transmitted outside of the second computing environment, confidential data (e.g., user demographic data) is authorized to be transmitted to the first computing environment and is not authorized to be transmitted to the a third computing environment, and public data (e.g., user usage data) is authorized to be transmitted to the first computing environment and the third computing environment. The third set of policies may include those policies in the first and/or second set of policies.

At operation 314, the response data is transmitted to the first computing environment of the OWT system. In examples, the second security abstraction engine provides the response data to a second computing system, such as computing system 232. The second computing system transmits the response data to the first computing environment based on the routing information. For instance, a computing device in the second computing system identifies the transaction identifier or the routing information in the message wrapper of the response data. The computing device then transmits the response data to a computing device or a component in the first computing environment based on the transaction identifier or the routing information.

In some examples, the second computing system transmits the response data to a fourth security abstraction engine. The fourth security abstraction engine identifies a fourth set of policies to apply to the response data based on the transaction identifier, as discussed above. The fourth set of policies includes policies that dictate the data content, types of files, and types of task requests that may be received from the second computing environment or transmitted by the first computing environment. For example, the fourth set of policies may include those policies in the first, second, and/or third set of policies. The fourth security abstraction engine applies the fourth set of policies to the response data and transmits the response data to the first bidirectional API. In other examples, the second computing system transmits the response data directly to the first bidirectional API.

At operation 316, the response data is provided to a source component in fulfillment of the data request. In examples, the first bidirectional API processes the response data to identify a destination associated with the response data. Processing the response data includes unwrapping the response data (e.g., removing one or more message wrappers from the response data) to identify the transaction identifier. The transaction identifier is used to identify connection information or a source identifier associated with the data request. For example, the first bidirectional API uses the transaction identifier to search the first data structure for a matching transaction identifier entry. The matching transaction identifier entry comprises a connection and port combination for a source component (e.g., computing device, service/application, or interface) used to generate and/or submit the data request to the first bidirectional API. In one example, the first bidirectional API provides the response data to the source component using a connection that has remained open while the data request was transmitted to the second computing environment. In this example, providing the response data to the source component using the open connection facilitates a synchronous data transfer experience. In another example, the first bidirectional API opens a new connection to the source component using the connection information. For instance, the first bidirectional API may use an IP address listed in the connection information for the source component. However, the first bidirectional API may open the new connection to the source component using a different port associated with the source component. In this example, providing the response data to the source component using the new connection facilitates an asynchronous data transfer experience. Upon providing the response data to the source component, the second unidirectional dataflow terminates.

Figure 4:
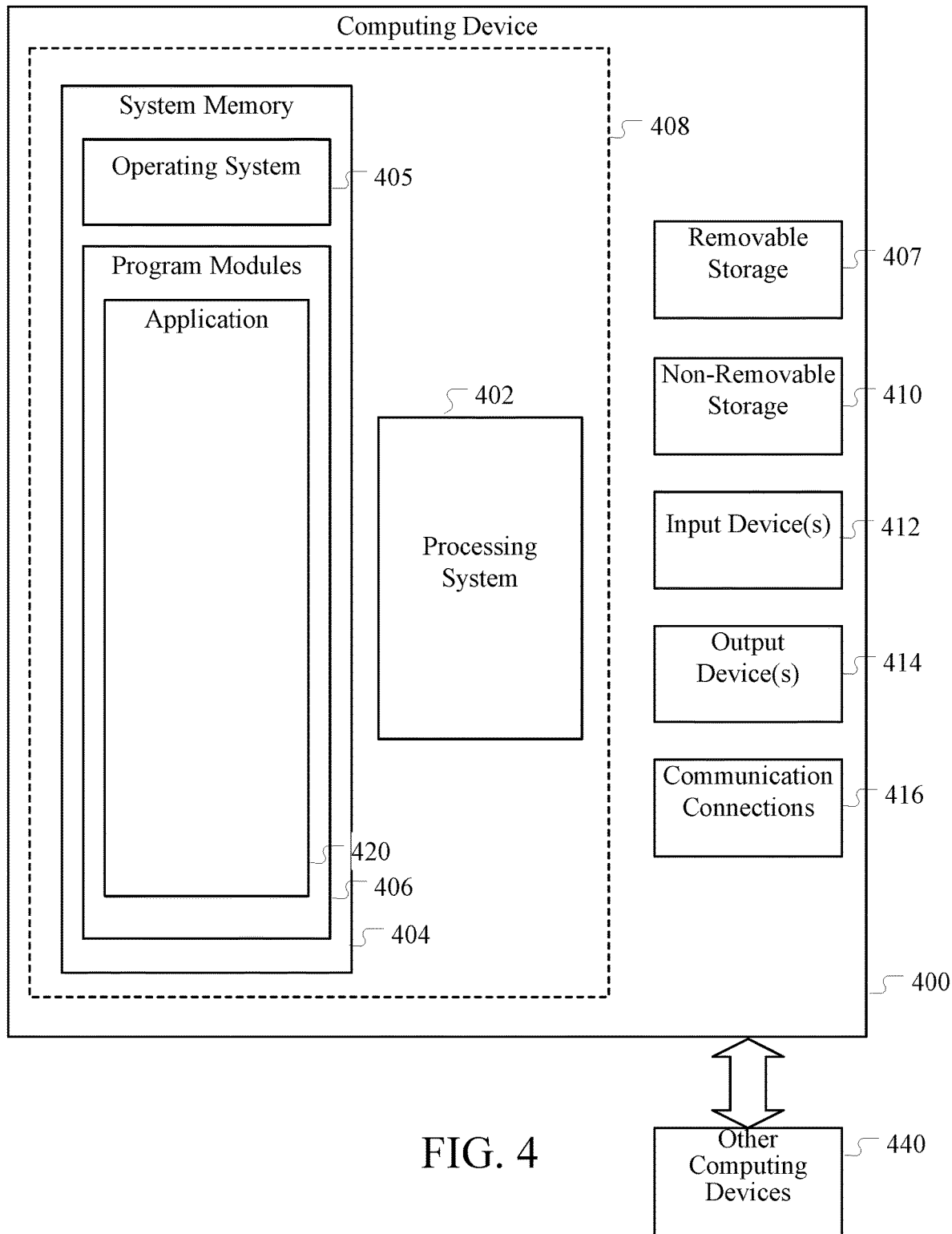
FIG. 4 is a block diagram illustrating example physical components of a computing device for practicing aspects of the disclosure.
Figure 5:
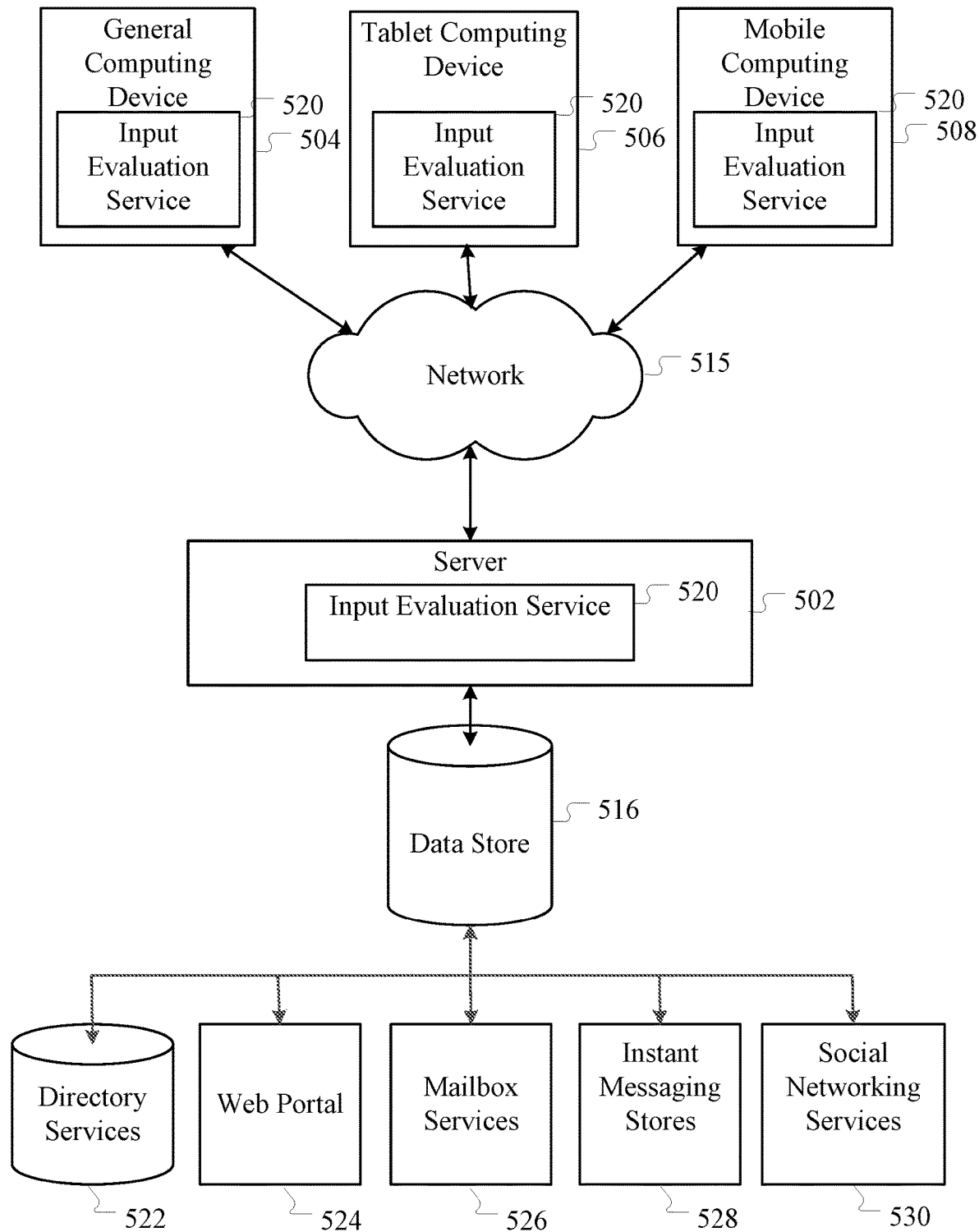
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing system 402 and a system memory 404. Depending on the configuration and type of computing device, the system memory 404 may comprise volatile storage (e.g., random access memory (RAM)), non-volatile storage (e.g., read-only memory (ROM)), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, or optical disks. Such additional storage is illustrated in FIG. 4 by a removable storage device 407 and a non-removable storage device 410.

As stated above, a number of program modules and data files may be stored in the system memory 404. While executing on the processing system 402 comprising one or more processors, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the data store 516, in addition to receiving graphical data useable to be either pre-processed at a graphic-originating system, or post-processed at a receiving computing system.

As will be understood from the present disclosure, one example of the technology discussed herein relates to a system comprising: a processing system; and memory coupled to the processing system, the memory comprising computer executable instructions that, when executed, perform operations comprising: receiving a data request at a first bidirectional application programming interface (API) in a first computing environment of a one-way transfer (OWT) system, the data request being associated with a transaction identifier; applying a first set of policies to the data request using a first security abstraction engine; transmitting the data request to a second computing environment of the OWT system; receiving, from the second computing environment, response data associated with the data request; and based on the transaction identifier, providing the response data in response to the data request.

In another example, the technology discussed herein relates to a method comprising: accessing first data at a first bidirectional application programming interface (API) in a first computing environment of a one-way transfer (OWT) system, the first data being associated with a transaction identifier; applying a first policy to the first data using a first policy engine in the first computing environment; transmitting the first data to a second bidirectional API in a second computing environment of the OWT system, the first computing environment and the second computing environment being separated by a data boundary of the OWT system; receiving, by the second bidirectional API, second data associated with the first data; applying a second policy to the second data using a second policy engine in the second computing environment; and providing the second data to the first computing environment.

In another example, the technology discussed herein relates to a one-way transfer (OWT) environment comprising: a processing system; and memory comprising computer executable instructions that, when executed, perform operations comprising: receiving a first data at a bidirectional application programming interface (API) in a first computing environment of a one-way transfer (OWT) system, the first data being associated with a transaction identifier and representing a first unidirectional dataflow; applying, based on the transaction identifier, a first set of policies to the first data using a first policy engine; transmitting the first data to a second computing environment of the OWT system; receiving second data associated with the first data, the second data representing a second unidirectional dataflow; applying a second set of policies to the second data, the first set of policies being different from the second set of policies; transmitting the second data to the first computing environment; and providing the second data to the first computing environment.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing system; and
memory coupled to the processing system, the memory comprising computer executable instructions that, when executed, perform operations comprising:
receiving a data request at a first bidirectional application programming interface (API) in a first computing environment of a one-way transfer (OWT) system, the data request being associated with a transaction identifier;
applying a first set of policies to the data request using a first security abstraction engine;
transmitting the data request to a second computing environment of the OWT system;
receiving, from the second computing environment, response data associated with the data request; and
based on the transaction identifier, providing the response data in response to the data request.

2. The system of claim 1, the operations further comprising:
in response to receiving the data request in the second computing environment, invoking a second bidirectional API in the second computing environment;
retrieving, by the second bidirectional API, response data associated with the data request;
applying a second set of policies to the response data using a second security abstraction engine; and
transmitting the response data to the first computing environment.

3. The system of claim 2, wherein transmitting the data request to the second computing environment comprises:

transmitting the data request to a third security abstraction engine in the second computing environment, wherein the third security abstraction engine dictates at least one of:
data content;
types of files; or
types of task requests that are authorized to be received from the first computing environment or transmitted by the second computing environment; and
applying, by the third security abstraction engine, a third set of policies to the data request prior to providing the response data to the second bidirectional API.

4. The system of claim 2, wherein retrieving response data comprises:
removing a message wrapper from the data request to create an unwrapped data request;
identifying, by the second bidirectional API, a destination indicated by the unwrapped data request; and
performing an action at the destination to receive the response data.

5. The system of claim 2, wherein the second set of policies dictates at least one of data content or types of files that are authorized to be transmitted from the second computing environment to the first computing environment.

6. The system of claim 2, wherein transmitting the response data to the first computing environment comprises:
transmitting, by the second security abstraction engine, the response data to the first bidirectional API.

7. The system of claim 1, wherein the first computing environment is:
untrusted by the second computing environment; and
unable to track the data request when the data request is in the second computing environment.

8. The system of claim 1, wherein the transaction identifier indicates a use case for the data request, the use case describing at least one of a user objective or routing information for the data request.

9. The system of claim 1, wherein the first bidirectional API stores:
a correlation between the transaction identifier; and
a first connection between the first bidirectional API and a source component, the first connection being used to provide the data request to the first bidirectional API.

10. The system of claim 9, wherein:
the first connection remains open while the response data is retrieved from the second computing environment; and
the first bidirectional API provides the response data to the source component using the first connection to facilitate a synchronous data transfer of the data request and the response data.

11. The system of claim 9, wherein:
the first connection is closed after the first bidirectional API receives the data request from the source component;
the first bidirectional API opens a second connection to the source component in response to receiving the response data; and
the first bidirectional API provides the response data to the source component using the second connection to facilitate an asynchronous data transfer of the data request and the response data.

12. The system of claim 1, wherein receiving the data request at the first bidirectional API comprises:
applying, by the first bidirectional API, routing information to the data request based on the transaction identifier, the routing information indicating a route to the second computing environment or a destination in the second computing environment; and
applying a message wrapper to the data request, the message wrapper comprising the routing information.

13. The system of claim 1, wherein the first set of policies dictates at least one of: data content, types of files, or types of task requests that are authorized to be transmitted from the first computing environment to the second computing environment.

14. The system of claim 1, wherein providing the response data in response to the data request comprises:
providing, by the first bidirectional API, the response data to an interface used to submit the data request to the first bidirectional API, the interface being implemented in the first computing environment.

15. A method comprising:
accessing first data at a first bidirectional application programming interface (API) in a first computing environment of a one-way transfer (OWT) system, the first data being associated with a transaction identifier;
applying a first policy to the first data using a first policy engine in the first computing environment;
transmitting the first data to a second bidirectional API in a second computing environment of the OWT system, the first computing environment and the second computing environment being separated by a data boundary of the OWT system;
receiving, by the second bidirectional API, second data associated with the first data;
applying a second policy to the second data using a second policy engine in the second computing environment; and
providing the second data to the first computing environment.

16. The method of claim 15, wherein:
the first data indicates a task to be performed in the second computing environment; and
the second data indicates a completion status of the task.

17. The method of claim 15, wherein the second bidirectional API associates the transaction identifier to the second data to enable the second data to be transmitted to the first computing environment.

18. The method of claim 15, wherein the first policy is identified by matching the transaction identifier to a corresponding transaction identifier stored in a data structure, the data structure correlating the corresponding transaction identifier to the first policy.

19. The method of claim 15, wherein:
the second policy prevents unauthorized data from being transmitted from the second computing environment to the first computing environment; and
the first policy is different from the second policy.

20. A one-way transfer (OWT) environment comprising:
a processing system; and
memory comprising computer executable instructions that, when executed, perform operations comprising:
receiving a first data at a bidirectional application programming interface (API) in a first computing environment of a one-way transfer (OWT) system, the first data being associated with a transaction identifier and representing a first unidirectional dataflow;
applying, based on the transaction identifier, a first set of policies to the first data using a first policy engine;
transmitting the first data to a second computing environment of the OWT system;

receiving second data associated with the first data, the second data representing a second unidirectional dataflow;

applying a second set of policies to the second data, the first set of policies being different from the second set of policies;

transmitting the second data to the first computing environment; and providing the second data to the first computing environment.

* * * * *